United States Patent [19]

Ishida

[11] 4,305,647
[45] Dec. 15, 1981

[54] CAMERA FLASH PHOTOGRAPHY SYSTEMS

[75] Inventor: Tokuji Ishida, Daito, Japan

[73] Assignee: Minolta Camera Kabushiki Kaisha, Osaka, Japan

[21] Appl. No.: 56,938

[22] Filed: Jul. 12, 1979

[30] Foreign Application Priority Data

Jul. 10, 1978 [JP] Japan ................................. 53-84285
Jul. 10, 1978 [JP] Japan ................................. 53-84286

[51] Int. Cl.³ ..................... G03B 7/085; G03B 15/05
[52] U.S. Cl. ...................................... 354/33; 354/43; 354/149
[58] Field of Search ............... 354/27, 29, 30, 32–35, 354/36, 38, 43, 44, 60 F, 145, 139, 149

[56] References Cited

U.S. PATENT DOCUMENTS

| | | | |
|---|---|---|---|
| 3,547,017 | 12/1970 | Harvey | 354/33 |
| 3,836,924 | 9/1974 | Kawasaki | 354/33 |
| 3,950,766 | 4/1976 | Erlichman et al. | 354/29 |
| 4,023,188 | 5/1977 | Ueda et al. | 354/33 |
| 4,146,317 | 3/1979 | Date et al. | 354/43 X |
| 4,146,318 | 3/1979 | Rochat | 354/43 |

Primary Examiner—L. T. Hix
Assistant Examiner—William B. Perkey
Attorney, Agent, or Firm—Watson, Cole, Grindle & Watson

[57] ABSTRACT

In a flash photography mode for a camera, a preliminary flash is generated for a substantial duration and substantially constant intensity prior to the primary flash used for actual photographing such that the diaphragm aperture of the camera may be changed from an initial aperture size by a control signal generated by a light receiving element for receiving light through the diaphragm aperture during the duration of the preliminary flash, which control signal interrupts the stopping-down of the aperture to determine the appropriate aperture size for the photographic conditions.

28 Claims, 12 Drawing Figures

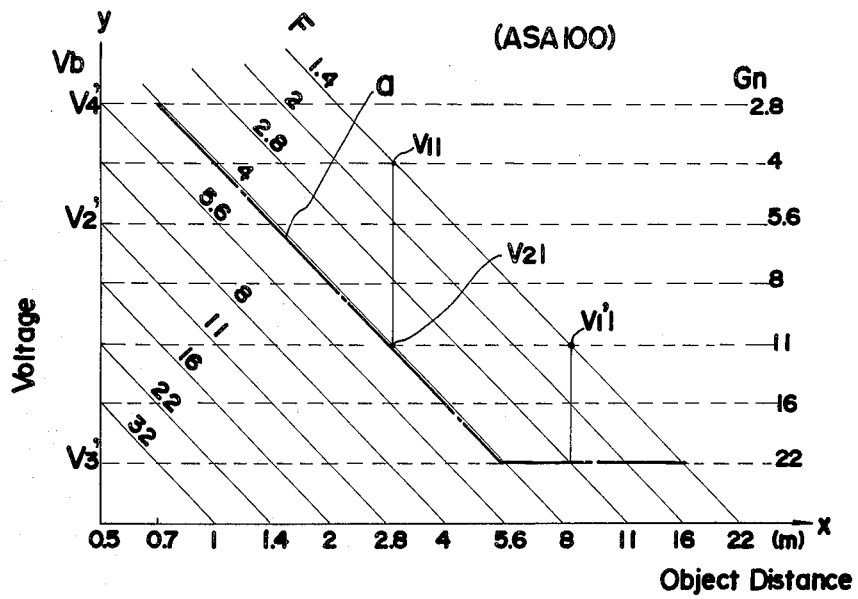
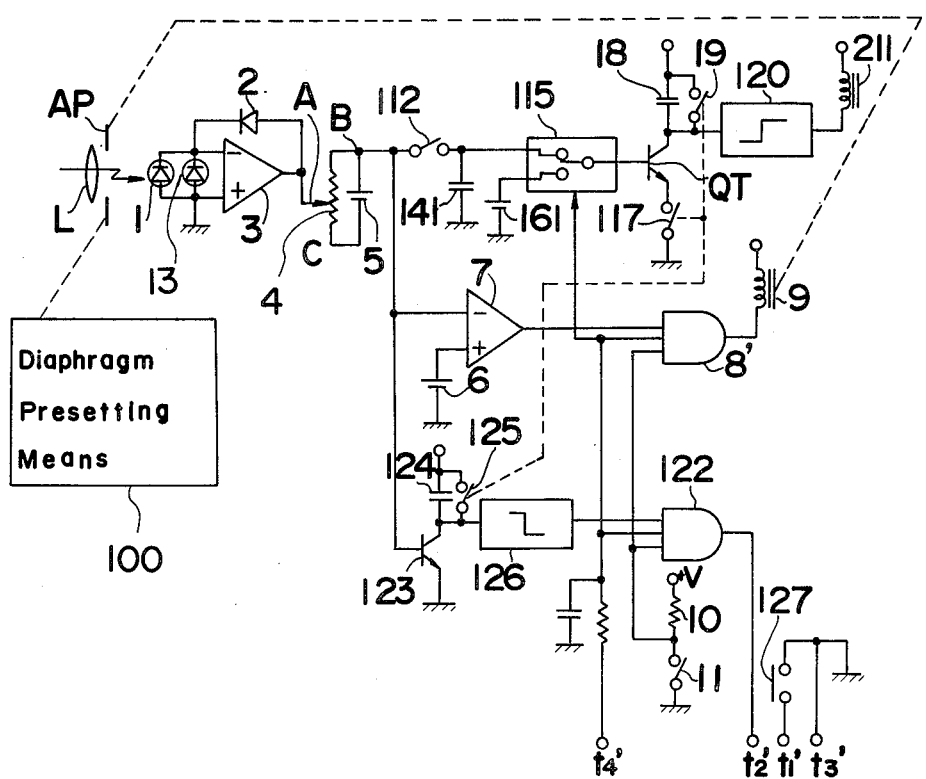

CAMERA FLASH PHOTOGRAPHY SYSTEMS

BACKGROUND OF THE INVENTION

1. Field of the Invention

The present invention relates to flash photography camera systems and more particularly to such camera systems in which the diaphragm aperture is determined by utilizing a preliminary flash which is produced prior to the exposure upon which the primary flash is produced.

2. Description of the Prior Art

It is known to obtain object distance information by means of preliminary flashing and to determine the aperture size in response to the object distance information. In such a case, however, means may be required for detecting the difference between the initial aperture size and an aperture size which is realized by the actual stopping-down motion of the diaphragm.

Further, it is not known in the prior art to control the aperture size in flash photography by considering the preset aperture value and the light measurement with preliminary flashing.

SUMMARY OF THE INVENTION

An object of the present invention is to provide improved flash photography camera systems.

Another object of the present invention is to provide improved means for determining the aperture size for flash photography.

Still another object of the present invention is to provide a means for determining the aperture size for flash photography with no means required for detecting the difference between the initial aperture size and the aperture size which is actually stopped-down.

A further object of the present invention is to provide a means for determining the aperture size for flash photography with a commensurate wide exposure control range.

Still a further object of the present invention is to provide a means for determining the aperture size for flash photography that is not influenced by ambient light.

An additional object of the present invention is to provide a means for determining the aperture size in a programmed manner for flash photography.

And yet another object of the present invention is to provide a means for determining the aperture for flash photography with the preset aperture size taken into consideration.

In a flash photography mode for a camera, a preliminary flash is generated for a substantial duration and substantially constant intensity prior to the primary flash used for actual photographing such that the diaphragm aperture of the camera may be changed from an initial aperture size by a control signal generated by a light receiving element for receiving light through the diaphragm aperture during the duration of the preliminary flash, which control signal interrupts the stopping-down of the aperture to determine the appropriate aperture size for the photographic conditions.

An alternative embodiment is provided for eliminating the effect of ambient light on the determination of the diaphragm aperture during the preliminary flashing by effectively subtracting the ambient light from the light received upon the preliminary flashing. In a further alternative embodiment, a relationship is established between the camera-to-object distance of the diaphragm aperture value, and the amount of flash light from an electronic flash device whereby both the aperture value and the amount of flash light are varied at a consistant ratio. In accordance with such modification, the value of using a fully open diaphragm aperture is reduced at greater object distances than with the first embodiment of the invention. The advantage is thereby gained of obtaining sharper and clearer photographs while conserving the amount of flash light at closer camera-to-object distances.

The fourth embodiment of the invention is a modification of the first embodiment wherein the diaphragm aperture value may be preset to a predetermined value and upon depression of the shutter button, the diaphragm aperture is stopped-down from the fully open diaphragm aperture to the preset diaphragm aperture value, providing that correct exposure conditions are detected from a preliminary flashing operation. However, if the object distance is so great that the flash light would be insufficient, the diaphragm aperture stopping-down operation is interrupted to affect flash photography at a more appropriate aperture setting than the preset aperture setting.

In yet another embodiment of the invention wherein object distance information is obtained by means of a preliminary flash to determine the correct aperture value under the maximum amount of flash light obtainable from an electronic flashing device such that if the diaphragm aperture preset by the operator is smaller than the diaphragm aperture size determined by the preliminary flash, exposure is effected by the diaphragm aperture size determined by the preliminary flash in place of the preset diaphragm aperture size. However, if the preset diaphragm aperture size is too large in relation to the object distance information and the minimum guide number, the preset diaphragm aperture size is decreased.

BRIEF DESCRIPTION OF THE DRAWINGS

FIG. 9 is a graph explaining other operations according to the present invention.

FIG. 10 is a circuit diagram showing the details of the fourth embodiment of the present invention.

DETAILED DESCRIPTION OF THE PREFERRED EMBODIMENTS

Figure 1:
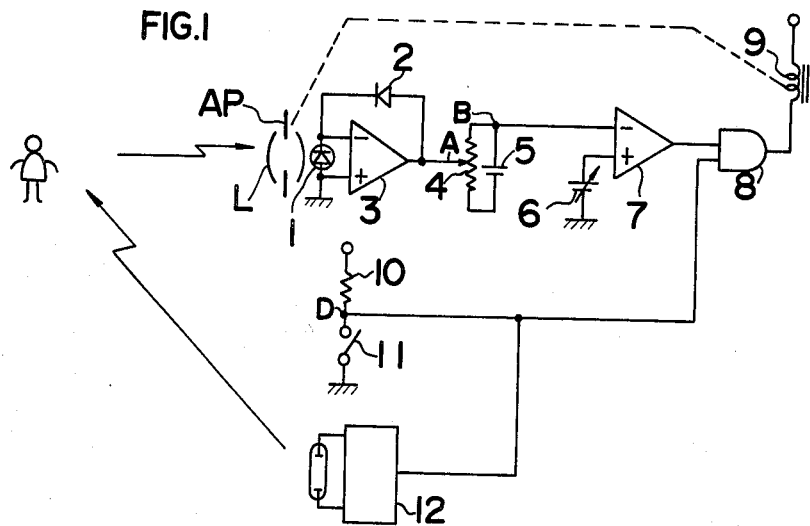
FIG. 1 represents a circuit diagram illustrating the first and fourth embodiments of the present invention.

Referring to FIG. 1, which shows one embodiment of the present invention, L represents a camera objective and AP a diaphragm aperture of camera objective L. Light measuring element 1 receives object light passing through camera objective L, and the output of light measuring element 1 is logarithmically compressed through operational amplifier 3 and logarithmic compression diode 2 and output at slider A of potentiometer 4. Potentiometer 4 and constant-voltage regulated power supply 5 together form a film sensitivity information circuit, by which the position of slider A represents the sensitivity of the film used. With the position of slider A set, there appears at upper end B of potentiometer 4 a voltage signal corresponding to $(Bv-Av)+Sv=Vb$, film sensitivity value Sv is added to the level at point A which is equal to the diaphragm aperture value Av subtracted from scene brightness value Bv, all values being in accordance with the APEX system of notation. Voltage Vb and a voltage preset by constant-voltage regulated power supply 6 are compared by comparator 7. The diaphragm aperture of the camera objective is first fully open, and upon depression of the shutter button, the diaphragm of the camera objective starts to be stopped-down. At the same time, switch 11 is opened causing a high level signal to be applied through resistor 10 to electronic flash device 12, which in turn emits a preliminary flash of relatively long duration at comparatively low but constant brightness. The duration of the flash is set slightly longer than the time required for diaphragm aperture AP to be stopped-down from a fully open position to the minimum aperture, i.e., 20 to 30 milliseconds in practice. When reflected upon an object, the preliminary flash light is incident through camera objective L to light measuring element 1. Thus, a voltage, i.e., Vb at point B decreases in value as diaphragm aperture AP is being stopped-down, and when it reaches a value preset by constant-voltage regulated power supply 6, the output of comparator 7 is inverted and applied through AND gate 8 to electromagnet 9, which in turn interrupts the stopping-down motion of diaphragm aperture AP to thereby determine the aperture size. After diaphragm aperture AP has been set in such a manner, the photograph is taken with the primary flash of the electronic flash device 12.

Figure 2:
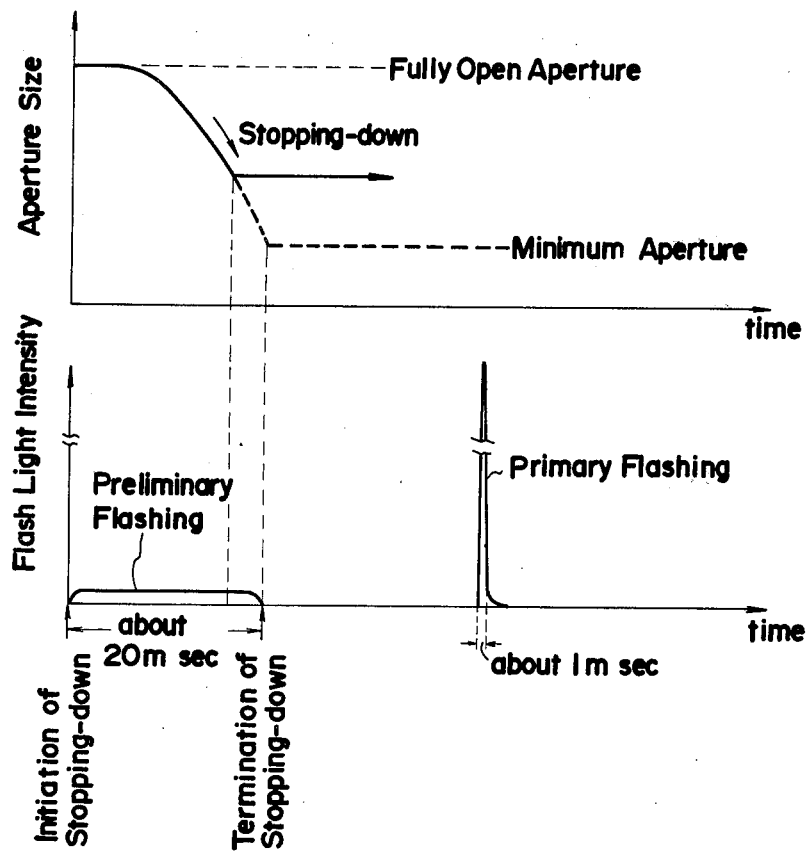
FIG. 2 represents a time chart of the flashing in accordance with the present invention.

FIG. 2 summarizes the above discussed relationship between time schedules for the light emission of electronic flash device 12 and the aperture value variations in diaphragm aperture AP of a camera objective in the embodiment of FIG. 1.

Figure 5:
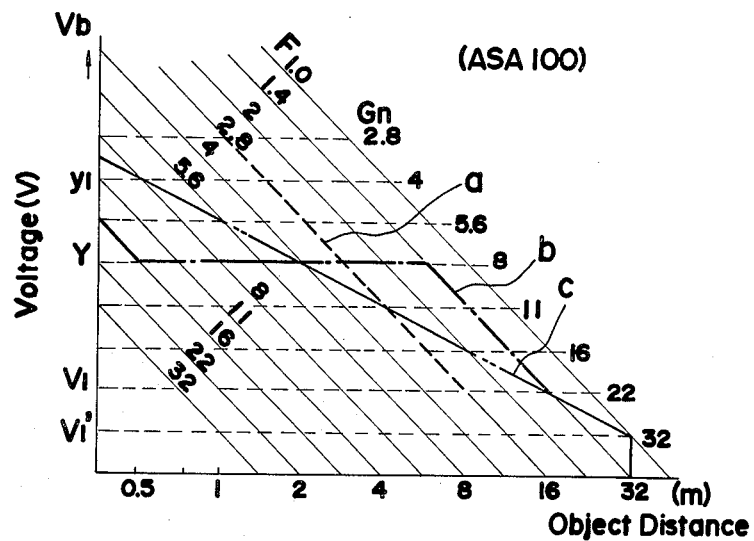
FIG. 5 is a graph explaining various operations of the present invention.

FIG. 5 is a diagram showing the relationships between a camera-to-object distance, a diaphragm aperture value and the amount of light emission in case of photography using a film with a sensitivity of ASA 100, a camera objective having a fully open diaphragm aperture of f/1.4 and a minimum diaphragm of f/16, as well as an electronic flash device capable of controlling light emission from the maximum guide number Gn22 to the minimum guide number Gn2.3. The ordinate shows a value of $Bv-Av+Sv=Vb$ (the voltage at point B in FIG. 1) at the time of preliminary flashing, while the abscissa represents camera-to-object distance. The parallel inclined lines in FIG. 5 represent diaphragm aperture values and the horizontal dotted lines represent voltages to be set by constant-voltage regulated power supply 6 in FIG. 1 in correspondence to the amount of light emission, i.e., guide number Gn, of an electronic flash device. Assume that the output of constant-voltage regulated power supply 6 is set at Y in FIG. 5. When the camera-to-object distance is 2.8 m, value Vb in the stage of preliminary flashing is first y1 (the ordinate of an intersection point between the line for the full open diaphragm aperture of f/1.4 and the perpendicular line at 2.8 m), and then Vb decreases as the diaphragm of the camera objective is being stopped-down, to coincide with Y, where the stopping-down operation of the diaphragm aperture is interrupted. The f-number at this time is f/2.8 as indicated by the inclined line passing through an intersection point between the horizontal line from Y and the perpendicular line at 2.8 m. Upon primary flashing at f/2.8 for a photograph, the electric flash device automatically controls light emission to flash at guide number Gn8, which corresponds to the horizontal line at Y. A similar relationship occurs in a range of camera-to-object distance from 0.5 m to 5 m, during which the electronic flash device flashes of Gn8. Since voltage Vb coincides with Y simultaneously with the initiation of the preliminary flashing at a camera-to-object distance of 5 m, the photograph is taken with the diaphragm of the camera objective remaining fully open. For camera-to-object distances between 5 m and 16 m, the diaphragm of the camera objective remains fully open without being stopped-down, and the amount of primary flashing light increases according to the camera-to-object distance from Gn8 up to Gn22. A camera-to-object distance of 16 m is the longest for ASA 100, the full open diaphragm aperture of f/1.4 and the maximum light emission of Gn22. Similarly, at a less than 0.5 m distance, voltage Vb is larger than Y even when the diaphragm of the camera objective is stopped-down to the minimum diaphragm aperture. In flash photography, in this case, Gn is controlled for a range from 8 to 5.6 under the action of automatic control means in the flash device. Thus, a wide range of object distance can be covered by the maximum control along chained line b. In contrast to the above operation of the present invention, dotted line a along line f/2.8 in FIG. 5 shows that a range available for photography is only from 1 m to 8 m in camera-to-object distance when f/2.8 is fixedly set on the electronic flash device in a conventional manner described earlier.

Figure 3:
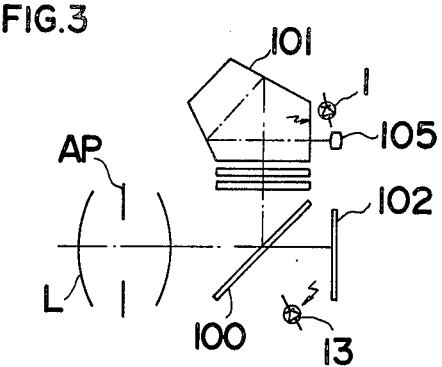
FIG. 3 representing a cross sectional view showing the arrangement of the light receiving elements of the present invention.

FIG. 3 shows an arrangement of light measuring elements in a camera for controlling automatic light emission of the electronic flash device. With reference to FIG. 3, light measuring element 1 is arranged near eyepiece 105 connected to prism 101 of a viewfinder. Light measuring element 1 corresponds to light measuring element 1 in FIG. 1 and sets diaphragm aperture AP by means of preliminary flash light. Light measuring element 13 arranged in front of film 102 receives light through camera objective L by means of the reflection on the film plane after reflex mirror 100 has been lifted and flash photography has started. The output of light measuring element 13 is then integrated by a circuit (not shown). When the integrated output corresponds to correct exposure, the light emission of the electronic flash device is terminated.

Figure 6:
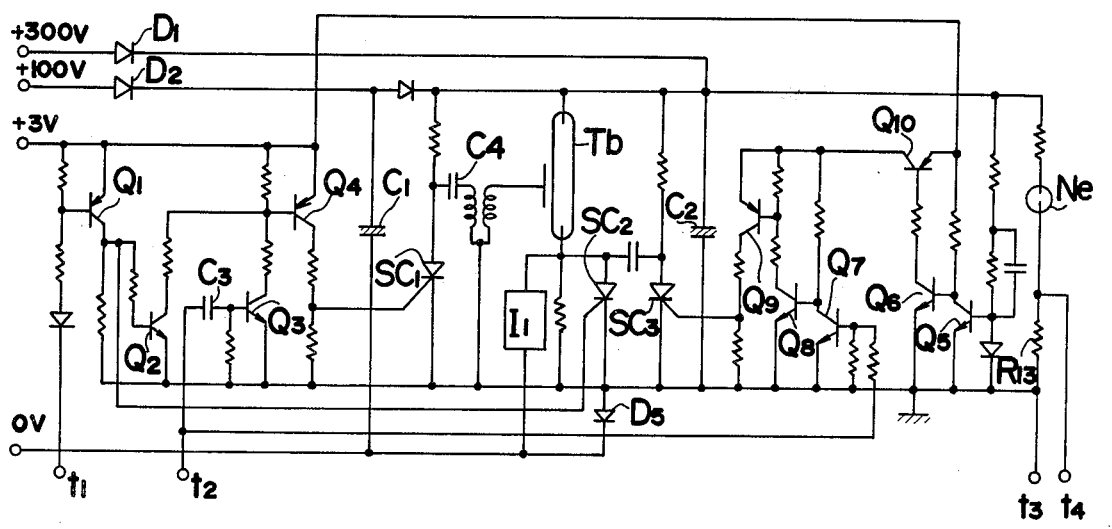
FIG. 6 is a circuit diagram showing part of the flash circuitry of the present invention.

FIG. 6 is a circuit of an embodiment of an electronic flash device according to the present invention. Capacitor C1 supplies energy for preliminary flashing by flash tube Tb, and main capacitor C2 supplies energy for primary flashing. A power supply (not shown) provides voltages of 3 V, 100 V and 300 V, and capacitor C1 and main capacitor C2 are charged at 100 V and 300 V, respectively. The power supply comprises a battery, an oscillation circuit and a boosting transformer, from which taps of 300 V and 100 V are provided to charge main capacitor C2 and capacitor C1 through rectifying diodes D1 and D2. 3 V is directly obtained from the battery. When main capacitor C2 is charged beyond a specific voltage level, neon tube Ne lights up to indicate that charging has been completed, and the voltage at the upper end of resistor R13 at terminal t4 increases to a high level. This high level signal is transmitted through terminal t4 to a control circuit (to be described later with reference to FIG. 4) inside a camera as a charge completion signal. Immediately when the diaphragm of the camera objective starts to be stopped-down upon depression of the shutter button, switch 11 in FIG. 1 is opened allowing a high level signal to be applied to terminal t2, so that a high level signal pulse is applied through capacitor C3 to the base of transistor Q3, whereby transistors Q3 and Q4 are turned on for a short period of time, causing thyrister SC1 to be triggered. This results in trigger capacitor C4 being discharged, causing flash tube Tb to flash. The tube current of flashtube Tb at this time flows through constant-voltage circuit I1, and since the tube current is suppressed, light emission occurs at a low brightness level and the tube current is made constant, resulting in light emission at constant brightness for preliminary flashing. At this time, the tube current is supplied from capacitor C1 and light emission is continued until capacitor C1 is completely discharged. Although capacitor C2 had been charged to 300 V, it remains undischarged since thyristor SC2 is cut off, thereby causing diode D5 to cut off the discharge path. Thyristor SC1 cannot maintain an ON condition after capacitor C4 has been discharged, and automatically turns off, allowing capacitor C4 to be charged again. When the shutter is then opened and a camera synchro contact is closed, a low level signal (ground potential) is applied to terminal t1, thus turning on transistor Q1. With transistor Q1 turned on, transistors Q2 and Q4 turn on, allowing thyristor SC1 to be turned on again, whereby flash tube Tb is triggered for primary flashing. Simultaneously, thyristor SC2 is turned on with transistor Q1 made conductive, and since thyristor SC2 shorts constant-voltage circuit I1, the tube current of flash tube Tb is released from its suppressed condition, resulting in light emission at high brightness. The tube current at this time is supplied from main capacitor C2. Switching transistor Q10 supplies power to transistors Q7, Q8 and Q9, and transistor Q10 is normally turned off. With flash tube Tb emitting light, the charged voltage of capacitor C2 suddenly drops, causing transistor Q5 to turn off, thereby turning transistor Q6 on, which in turn allows a base current to flow to transistor Q10, which is turned on to supply power to transistors Q7, Q8 and Q9. Immediately after the start of light emission, light measuring element 13 in FIG. 3 receives the emitted light. When the correct exposure is reached, terminal t2 is returned to a low level by a signal coming from a circuit including the light measuring element 13. This is followed by transistor Q7 being turned off, thereby causing transistors Q8 and then Q9 to be turned on, respectively. Therefore, thyristor SC3 is turned on to make the anode potential of thyristor SC2 negative for a brief time since the anodes of thyristors SC2 and SC3 are capacitively connected, thereby turning off thyristor SC2. With thyristor SC3 on and thyristor SC2 off, the discharge of flash tube Tb is stopped, resulting in correct exposure for flash photography.

Figure 4:
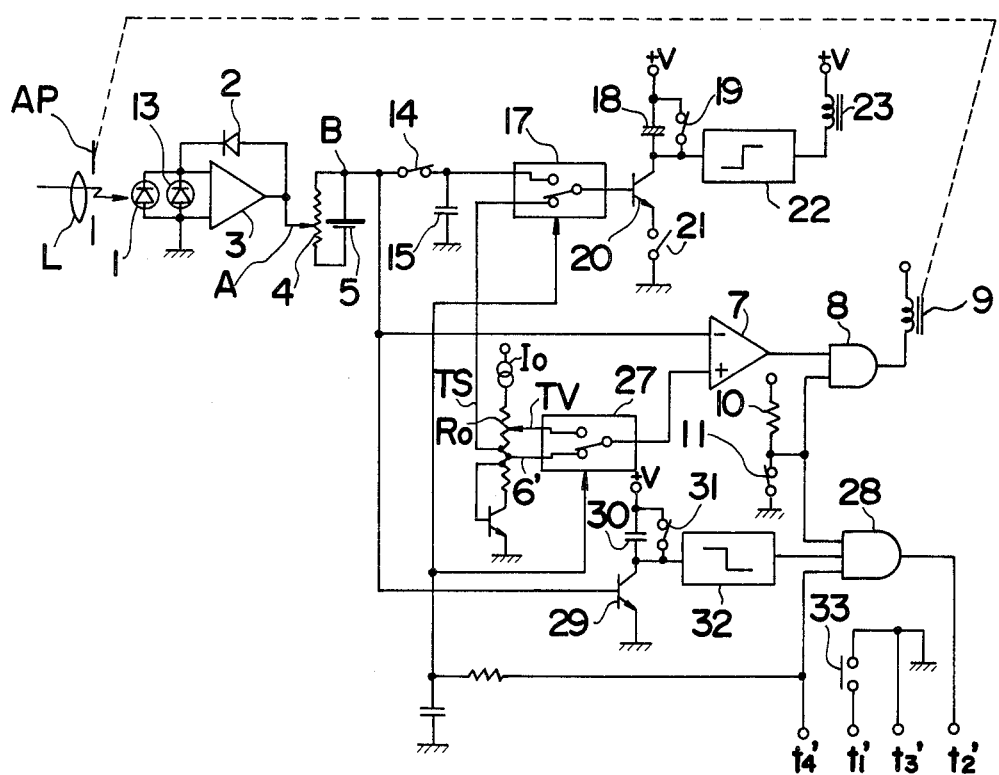
FIG. 4 is a circuit diagram showing the detail of the first embodiment of the present invention.

FIG. 4 is a detailed circuit diagram including the parts which are not shown in the embodiment of FIG. 1, and the same reference symbols are used for parts identical to those in FIG. 1. Constant-voltage regulated power supply 6 for setting the light emission in FIG. 1 corresponds to a combination which consists of constant-voltage circuit Io and sliding resistor Ro in FIG. 4, where a constant voltage for comparison is set by fixed terminal 6'.

With reference to the circuit in FIG. 4, a description of ordinary photography is as follows. At this time, changeover switches 17 and 27 are both connected to their respective upper contacts. Sliding terminal TV is used to set the shutter speed. Switch 14 is normally closed and is opened when the diaphragm aperture AP has been set, and voltage VB at point B when switch 14 is opened is charged and stored by capacitor 15. When diaphragm aperture AP starts to be stopped-down upon depression of the shutter button, switch 11 is opened to turn on GATE 8, and at the same time voltage Vb gradually decreases. Voltage Vb is compared by comparator 7 with a voltage preset by sliding terminal TV and when both voltages are matched, electromagnet 9 operates to fix diaphragm aperture AP, whereby switch 14 is opened. Subsequently, switch 19 is opened in association with the start of the shutter opening operation, and switch 21 is closed, causing transistor 20 to conduct current commensurate with the storage signal of capacitor 15, whereby capacitor 18 is charged. When this charged voltage reaches a specific level, switching circuit 22 is inverted to energize electromagnet 23, which in turn closes the shutter. In this manner, the diaphragm aperture value and shutter speed are determined for photography.

For flash photography, when the main capacitor of an electronic flash device (in FIG. 6) is completely charged, a high level signal is sent to terminal t4' (connected to terminal t4 in FIG. 6), causing switches 17 and 27 to be changed over to their lower contacts, respectively. This allows the voltage at fixed tap TS of potentiometer Ro to be applied to the base of transistor 20, and the shutter speed to be realized is fixed at a flash synchronizing speed, e.g., 1/60 second. Additionally, the voltage to be applied to the plus terminal of comparator 7 is at the level of fixed tap 6'. When diaphragm aperture AP starts to be stopped-down upon depression of the shutter button, switch 11 is opened to turn on both AND gates 8 and 28. The output of switching circuit 32 is first at a high level, and with switch 11 opened, the output of AND gate 28 increases to a high level (the charging of the main capacitor in the electronic flash device has been completed), and the high level signal is applied from terminal t2' to terminal t2 in the circuit in FIG. 6, whereby flash tube Tb starts to produce a preliminary flash. Diaphragm aperture AP is set as described in relation to FIG. 1, and with the shutter then opened, synchro contact 33 is closed and switch 31 is opened. When synchro contact 33 is closed with terminals t1' and t3' connected to terminal t1 and t3 in the circuit of FIG. 6, flash tube Tb starts the primary flash firing. At this time, the output of light measuring element 13 (previously explained with reference to FIG. 3) is logarithmically converted and added to the ASA sensitivity, the resultant signal being applied to the base of transistor 29. Therefore, capacitor 30 is charged by a collector current commensurate with the scene brightness as illuminated by the light emission. The charged voltage of capacitor 30 reaches a specific level, when switching circuit 32 is inverted to cause its output to switch to a low level, whereby the output of AND gate 28 decreases to a low level. This causes terminal t2 in the circuit of FIG. 6 to decrease to a low level which stops light emission, thereby providing correct exposure for flash photography.

Figure 7:
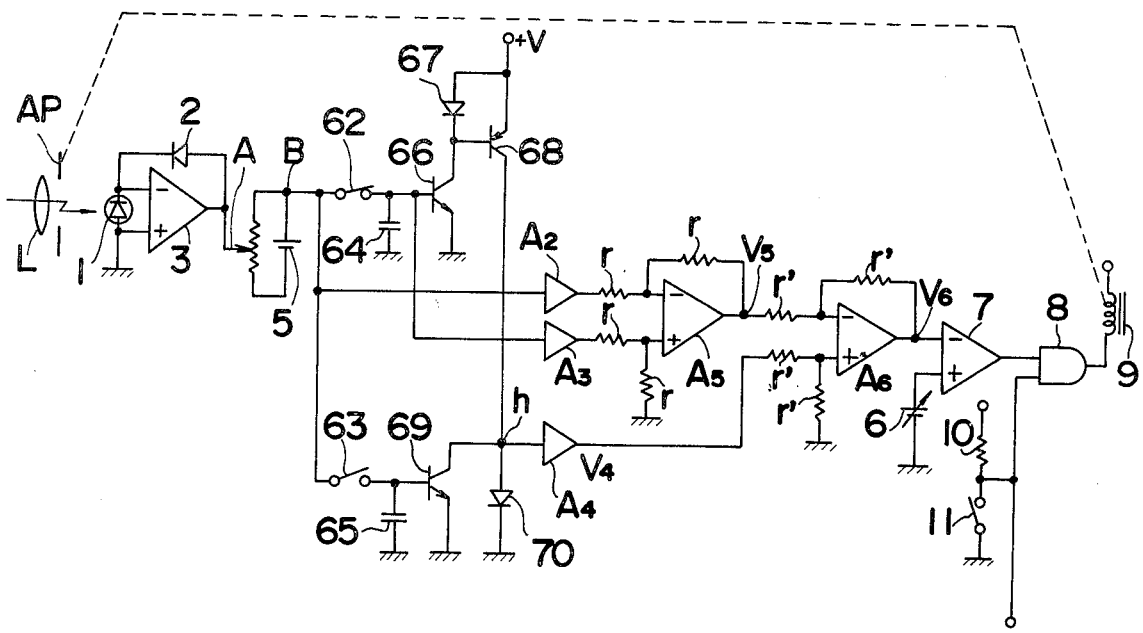
FIG. 7 is a circuit diagram showing a second embodiment of the present invention.

FIG. 7 shows another embodiment of the present invention which eliminates the affects of ambient light in existence during preliminary flashing. When the field of an object to be photographed is dark to a certain extent, ambient light does not appreciably affect the diaphragm aperture setting by preliminary light. When the field is bright because of ambient light, however, the affects of natural light upon the diaphragm aperture setting cannot be ignored since the intensity of preliminary light is small relative to the ambient light. In FIG. 7, the components including camera objective L, diaphragm aperture AP, light measuring element 1 and operational amplifier 3, and the components comparator 7, constant-voltage regulated power supply 7, AND gate 8, resistor 10 and switch 11 for controlling electromagnet 9, are all identical to the same numbered components in FIG. 1, and diaphragm aperture AP is determined at the correct position by the operation of electromagnet 9. The outstanding feature of this embodiment resides in the circuitry between terminal B and the minus terminal of comparator 7.

In FIG. 7, the voltage Vbo at point B with diaphragm aperture AP being still fully open and with the preliminary flash light not being effected, corresponds to a value of $Bvo-Avo+Sv$, wherein the brightness of an object to be photographed under ambient light is assumed to be Bvo and fully open diaphragm aperture, Avo are all in accordance with the APEX system, the voltage at point B is charged and stored by capacitor 65 via switch 63 which is normally closed. Switch 63 is opened immediately before preliminary flashing starts upon the opening of switch 11, and the storage of capacitor 65 is fixed at Vbo. After the preliminary flashing has been started, switch 62, which is also normally closed, is opened immediately before diaphragm aperture AP starts to be stopped-down from its full open condition. Thus, capacitator 64 is also capable of being charged by a voltage at terminal B, with scene brightness illuminated both by ambient light and the preliminary flash light. With that scene brightness assumed to be Bv, the voltage at point B, at this time, corresponds to a value of $Vb=Bv-Avo+Sv$, and Vb is maintained by capacitor 64. The charged voltages at capacitors 64 and 65 are applied to the bases of transistors 66 and 69 for antilogarithmic conversion, and the collector currents of transistors 66 and 69 are representative of the anitlogarithms of Vb and Vbo, respectively. Since the current flow through diode 67 is identical to the collector current of transistor 66, and the voltage across the base-emitter of transistor 68 is equal to the voltage across diode 67, the collector current I of transistor 68 is equal to that of transistor 66. The collector current I of transistor 68 is divided, at point h, into the collector current Io of transistor 69 and the current of diode 70, and therefore, the current flowing through diode 70 is the difference in value between the antilogarithms of Vb and Vbo. Assuming that the brightness of an object to be photographed under ambient light is Bo and the brightness under preliminary flash light alone is B', the following is obtained.

$$Bvo = \log Bo$$

$$Bv = \log (Bo + B')$$

From the following equations, which are representative of the antilogarithm Vbo and Vb:

$$Io = KeVbo = Ke - Avo + Sv \cdot Bo$$

$$I = KeVbo = Ke - Avo + Sv \cdot (Bo + B')$$

The current flow through diode 70 corresponds to a value of I−Io as obtained below:

$$Ke - Avo + Sv(Bo + B') - Bo = K'B'$$

and the voltage across diode 70 is a logarithm of the current, I−Io. Therefore the voltage across diode 70 is represented by the following equation, $$Bv' - Avo + Sv = Vb' \tag{1}$$

The value corresponds to the APEX system value of scene brightness when preliminary flash light alone exists, with any effects of ambient light being eliminated. Thus, the measured value by preliminary light with diaphragm aperture AP fully opened is maintained at point h.

The diaphragm of diaphragm aperture AP, then, starts to be stopped-down. Voltage Vb at terminal B at this time is applied through impedance conversion amplifier A2 to a subtraction circuit comprising operational amplifier A5 and four resistors r as a subtrahend signal, while the stored voltage of capacitor 64, i.e. Vb is applied through impedance conversion amplifier A3 to the subtraction circuit as a minuend signal. Therefore, output V5 of operational amplifier A5 is obtained as follows:

$$V5 = Bv - Avo + Sv - Bv - Va + Sv = Av - Avo$$

This indicates the number of steps for the stopping-down of diaphragm aperture AP. Operational amplifier A6 forms a subtraction circuit along with four resistors r', and from the voltage at node h obtained by the above equation (1), voltage is subtracted, as per the following equation:

$$Bv' - Avo + Sv - (Av - Avo) = Bv' - Av + Sv$$

Wherein Av represents the diaphragm aperture value according to the APEX system when the diaphragm aperture is stopped-down. The above equation provides information of the diaphragm aperture setting when preliminary light alone exists, and when this value is compared by comparator 7 with the voltage of constant-voltage regulated power supply 6 and both are matched, the output of comparator 7 is inverted to interrupt the stopping-down motion of diaphargm aperture AP through AND gate 8 and electromagnet 9. It is noted that operational amplifier A4 applies a voltage across diode 70 to the subtractor circuit of operational amplifier A6 for impedance conversion.

Figure 8:
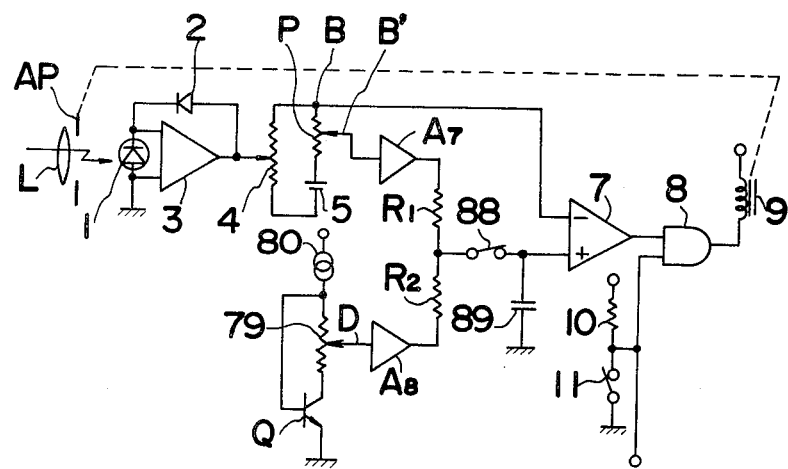
FIG. 8 is a circuit diagram showing a third embodiment of the present invention.

FIG. 8 shows still another embodiment of the present invention. This embodiment effects a relationship between a camera-to-object distance, a diaphragm aperture value and the amount of flash light from an electronic flash device as shown by two-point chained line c in FIG. 5. Both the aperture value and the flash light amount are varied at a constant ratio as the object distance becomes shorter from its maximum 16 m at which a photograph is capable with the maximum light output of an electronic flash device (Gn22 in Figure) and the fully open diaphragm aperture (f/1.4 in FIG. 5). According to this embodiment, the frequency of using the fully open diaphragm aperture is reduced at the greater object distance when compared with the program shown by one-point chained line b in FIG. 5 realized by the embodiment of FIG. 1, thereby making sharper and clearer photographs possible, and the amount of flash light can be saved at the closer camera-to-object distance.

In FIG. 8, the components from camera objective L to terminal B and from terminal B to electromagnet 9 through comparator 7, AND gate 8 by which the stopping-down motion of diaphragm aperture AP is interrupted by electromagnet 9 are identical to that in FIG. 1, and the same reference symbols are used for the components corresponding to those in FIG. 1, the explanation of which is omitted. There appears at terminal B a voltage corresponding to a signal of $Vb = Bv - Av + Sv$ as described in FIG. 1. The following description is of the case in which a camera, film and an electronic flash devive identical in performance to those described in FIGS. 1 and 5 are used. As the minimum f-number of a camera objective is 1.4 and the maximum amount of flash light is represented by guide number Gn22, the maximum distance available for flash photography is 16 m according to FIG. 5. Therefore, to make photography possible at a distance of 16 m, f/1.4 and Gn22, the voltage to be set at the plus terminal of comparator 7 under the above conditions must be equal to voltage V1 in FIG. 5. Assuming that diaphragm aperture AP is fully open, voltage Vbo under preliminary flash light is varied along the line of f/1.4 depending upon the object distance. According to the program indicated by line c in FIG. 5, diaphragm aperture AP is to be stopped-down by one step from f/1.4 and the amount of flash light of the electronic flash device is to be also lowered by one step from Gn22 when the object distance of 16 m is halved to 8 m. To implement the program shown by line c, a voltage of $V1 + (Vb - V1)/2$ is applied to the plus terminal of comparator 7. This is the feature of the embodiment in FIG. 8. If the program represented by line c in FIG. 5 is required to be maintained with the exchange of the objective, voltage V1 must be changed according to the minimum f-number of an individual exchangeable lens mounted on the camera. When, for example, a camera objective having a fully open diaphragm aperture of f/2 is used, the voltage at a point where dotted line Gn16 crosses the ordinate should be V1. To treat the voltage set at the plus terminal of comparator 7 as a constant value, however in the embodiment, voltage Vbo at point B is converted to voltage Vbo' which is the voltage at point B when an imaginary objective having a fully open diaphragm aperture of f/1.0 is considered mounted on the camera, and voltage V1' corresponding to the line of imaginary guide number Gn32 of an electronic flash device is used so that an object at a distance of 32 m may be photographed by means of the imaginary objective. Under this setting, the program represented by chain line c in FIG. 5 is realized by the plus terminal of comparator 7. In FIG. 8, the above-mentioned voltage Vbo' is obtained at terminal B' of potentiometer p which is moved in accordance with the fully open diaphragm aperture of an individual lens mounted on the camera. In FIG. 8, voltage V1' is obtained at sliding terminal D in a constant-current circuit formed by power supply 80, sliding resistor 79 and transistor Q, and that voltage is applied through buffer amplifier (impedance coversion amplifier) A8 to the lower terminal of resistor R2, and a voltage at node B' is applied through buffer amplifier A7 to the upper terminal of resistor R1 in series connection with resistor R2. Therefore, the voltage across series connected resistors R1 and R2 is $Vbo' - V1'$, and voltage at the node between resistors R1 and R2 is $V1' + (Vb - V1') \cdot R2/(R1 + R2)$. When R1 is equal to R2, the voltage at the node between resistors R1 and R2 is $V1' + (Vb - V1')/2$. This voltage is charged and stored by capacitor 89 via switch 88 which is normally closed. With the shutter button initially depressed, switch 11 is first opened, allowing the electronic flash device to start preliminary flashing, and switch 88 is then opened immediately before diaphragm aperture AP starts to be stopped-down. Thus, a voltage of $V1' + (Vbo' - V1')/2$ at the fully open diphargm aperture is maintained by capacitor 89, and that voltage is applied to the plus terminal of comparator 7. As diaphragm aperture AP is stopped-down, voltage Vb at terminal B gradually decreases. Voltage Vb is directly applied to the minus terminal of comparator 7 to be compared with voltage $V1' + (Vbo' - V1')/2$, and when both are matched, the output of comparator 7 is inverted to energize electromagnet 9, which in turn causes diaphragm aperture AP to be clamped at the aperture value then in effect.

For the purpose of making an introductory explanation of the fourth embodiment, reference is again made to FIG. 1, as the fourth embodiment in principle has the identical structure as that of FIG. 1. The fourth embodiment is characterized by its operation. In the fourth embodiment, the diaphragm aperture value of the camera objective is preset, and upon depression of the shutter button, diaphargm aperture AP is stopped-down from the fully open diphargm aperture to the preset diaphragm aperture value, whereby the shutter is opened. When it is detected from the preliminary flashing that a correct exposure is obtainable by flash photography with the preset diaphragm aperture value, flash photography is taken after diaphragm aperture AP has been stopped-down to the preset diaphragm aperture value. When an object to be photographed, however, is so distant that an electronic flash device may be insufficient even if it fires primary flash with the maximum light intensity within its capacity with the preset diaphragm aperture value, this condition is detected from the preliminary flashing and electromagnet 9 operates to interrupt the stopping-down motion of diaphragm aperture AP at an appropriate position of the diaphragm aperture before diaphragm aperture AP is stopped-down to the preset diaphragm aperture value, whereby flash photography is effected.

In FIG. 9, the ordinate represents the voltage at node B in FIG. 1 at the time of preliminary flashing, and the abscissa represents the camera-to-object distance. The parallel gradient lines show a relationship between the voltage at node B and the camera-to-object distance when the value of diaphragm aperture AP for the camera objective L is constant. The numerals on the lines, such as f/1.4 and the like, represent the f-numbers of the camera objective. The horizontal dotted lines indicate the amount of flash light from the electronic flash device, with such numeral as Gn2.8 at the ends of the individual dotted lines being guide numbers commensurate with the respective flash light amount. The horizontal dotted lines indicate how the diaphragm aperture value should be determined in response to the camera-to-object distance to obtain correct exposure when the amount of light emission is kept constant. For example, dotted line Gn8 indicates that an aperture of f/1.4 is correct for a camera-to-object distance of 5.6 m and aperture of f/2 for 4 m with the amount of flash light fixed at Gn8. It should be understood that FIG. 9 applies to a case where a film with a sensitivity of ASA 100 is used.

Assuming that the camera represented by FIG. 1 has an objective with a fully open diaphragm aperture of f/1.4, a film with a sensitivity of ASA 100 is used and the diaphragm aperture value is preset at f/4, for example, the operation is as follows using FIG. 9. A range available for automatic control of the amount of flash light by the electronic flash device is from guide number Gn22 to Gn2.8, and consideration is first given to the case of a camera-to-object distance of 2.8 m. In response to the start of the stopping-down motion of the diaphragm aperture AP from f/1.4 upon depression of the shutter button, switch 11 is opened to start preliminary flashing. The voltage at node B is first v11 in FIG. 9 and gradually decreases, and the change in the voltage is stopped when diaphragm aperture AP reaches the preset diaphragm aperture value of f/4. The voltage at node B at this time is v21 in FIG. 9, and the shutter is then opened, causing the electronic flash device to emit primary flashing. The flash light amount at this time corresponds to Gn11 through the operation of an automatic flash light control circuit. In this case, the voltage at node B applied to the minus terminal of comparator 7 is higher than the voltage level of constant-voltage regulated power supply 6, causing the output of comparator 7 to remain uninverted, whereby electromagnetic 9 remains inoperative. The voltage of constant-voltage regulated power supply 6 is set at V3' in FIG. 9, the voltage coinciding with horizontal line Gn22. Considering the case of camera-to-object distance of 8 m, the voltage at node B is V11' with the diaphragm aperture fully open, and from this level the voltage gradually decreases in accordance with the stopping-down motion of the diaphragm and coincides with the voltage V3' of constant-voltage regulated power supply 6 when diaphragm aperture AP is stopped-down to f/2.8. This causes the output of comparator 7 to be inverted to energize electromagnet 9, which in turn interrupts the stopping-down motion of the diaphragm aperture AP to set the aperture value at f/2.8, whereby the flash photograph is taken. Thus, the diaphragm aperture is not stopped-down to the preset value f/4 in this case. The amount of primary flash light from the electronic flash device, at this time, corresponds to the maximum Gn22. Thus, with the fourth embodiment, flash photography is taken in accordance with the program indicated by line a in FIG. 9 consisting of a gradient line partly along a preset diaphragm aperture value, e.g. f/4 and a horizontal dotted line partly representing the maximum light emission from the electronic flash device.

FIG. 10 shows a detailed circuit diagram of the fourth embodiment. The operation of the FIG. 10 circuit is in conjunction with FIGS. 2, 3 and 6. Changeover switch 115 is closed on the upper contact, and it changes over to the lower contact for flash photography when a charge termination signal from terminal t4 in the circuit of FIG. 6 is applied to terminal t4'. Transistor QT, capacitor 18 and switching circuit 120 together form an exposure time control circuit, and the shutter is closed by the energization of electromagnet 211. In ordinary photography, the voltage at node B is stored by capacitor 141 via memory switch 112 when diaphragm aperture AP of the camera objective is stopped-down to a preset diaphragm aperture value determined by presetting means 100. (In this case, electromagnet 9 is inoperative to control the diaphragm aperture since t4 is at a low level and the output of AND gate 8 is low). The storage of capacitor 141 is fixed when switch 112 is opened immediately before the reflex mirror 100 in FIG. 3 is lifted. When the shutter is started to be opened, switch 117 is closed, switch 19 is opened, and transistor QT is controlled by the storage voltage of capacitor 141 to charge capacitor 18. When capacitor 18 is charged to a specific level, the output of switching circuit 120 is inverted to energize electromagnet 211, thereby closing the shutter.

In flash photography, switch 115 is changed over to the lower contact when the main capacitor of the electronic flash device in FIG. 6 is completely charged, and the voltage terminal t4' is high as described above. Immediately when diaphragm aperture AP starts to be stopped-down, switch 11 is opened, and the output of switching circuit 126 is first at a high level. Therefore, all of the three terminals of AND gate 122 are at a high level, and this output is applied through terminal t2' to terminal t2 of the circuit in FIG. 6 for the start of preliminary flashing. As described with reference to FIGS. 1 and 9, diaphragm aperture AP is then stopped-down to a preset aperture value determined by preset means 100, or controlled by the operation of electromagnet 9 at a value larger than the preset diaphragm aperture, whereby the reflex mirror is lifted and the shutter is opened. When the shutter opened, switches 117 and 119 operate in the above-described manner and switch 125 is opened. When synchro contact 127 is closed with the shutter fully opened, a signal is sent to terminals t1 and t3 in FIG. 6 via terminal t1' and t3', thereby firing the primary flash. At this time, reflected light from the object is received by light measuring element 13, the output of which is applied through node B to the base of transistor 123 to control the collector current thereof. The collector current of transistor 123 is integrated by capacitor 124, and when the charged voltage of capacitor 124 reaches a specific level, the output of switching circuit 126 is inverted to a low level, which in turn switched the output of AND gate 122, whereby primary flash firing is stopped. Since switch 115 is closed on the lower contact, the shutter speed is controlled at a constant value determined by the voltage of power supply 161, e.g. 1/60 second.

Figure 11:
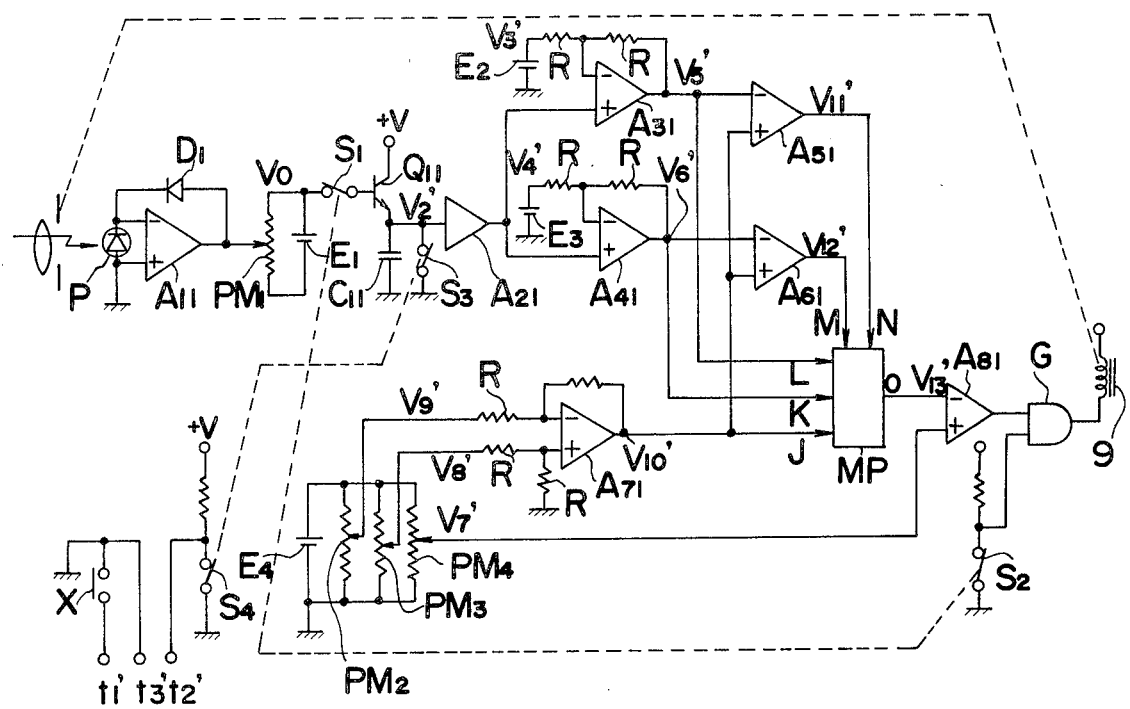
FIG. 11 is a circuit diagram showing a fifth embodiment of the present invention.

FIG. 11 is a circuit diagram showing a fifth embodiment of the present invention. A diaphragm aperture presetting dial (not shown) is provided on the camera body, and the dial is set at any required preset aperture value by the photographer. The dial interlocks with the slider of first potentiometer PM2 in FIG. 11, from which a voltage signal commensurate with the preset diaphragm aperture value is produced. Meanwhile, a voltage signal commensurate with the fully open diaphragm aperture of the camera objective to be used is produced from the slider of second potentiometer PM3 in FIG. 11. A pin is provided on the lens barrel of the camera objective to indicate a fully open diaphragm aperture, the pin being arranged to interlock the slider of potentiometer PM3 when the lens barrel is attached to the camera body, so that a voltage signal commensurate with the fully open diaphragm aperture of the camera objective may be produced from the slider of potentiometer PM3. These two signals from the sliders of potentiometers PM2 and PM3 can be processed into a voltage commensurate with the difference in the number of steps between the fully open diaphragm aperture and a preset diaphragm aperture value. In contrast to the voltage indicative of the difference in the number of steps with respect to the preset aperture value, a voltage commensurate with the difference in the number of steps between the fully open diaphragm aperture and an actual diaphragm aperture AP which is being stopped-down from its fully open position toward the minimum aperture after the depression of the camera release button. This output voltage with respect to the actual aperture value, is generated when a diaphragm aperture drive lever carried by the camera body moves the slider of third potentiometer PM4 in FIG. 11 while driving a diaphragm aperture control lever provided on a lens barrel during the stopping-down motion of the diaphragm aperture. The above two signals indicative of the two differences in the number of steps are compared during the stopping-down motion of the diaphragm of the camera objective, and when both are matched, an electromagnet is energized to restrain the stopping-down operation, whereby diaphragm aperture AP is set at a value preset by the dial. The feature of the above diaphragm aperture control lies in that a diaphragm aperture value can be determined commensurate with a given voltage signal. Therefore, the voltage signal indicative of a diaphragm aperture value may be any other that given by the dial setting.

The fifth embodiment utilizes the above described diaphragm aperture control means. According to the fifth embodiment, object distance information is obtained by means of the preliminary flashing to determine the correct aperture value under the maximum amount of the flash light of an electronic flash device commensurate with the obtained camera-to-object distance information. If the diaphragm aperture size preset by the dial is smaller than the diaphragm aperture size determined by the preliminary flashing, exposure is effected by the diaphragm aperture size determined by the preliminary flashing in place of the preset diaphragm aperture size. Moreover, if the preset diaphragm aperture size is too large in view of the object distance information and the minimum guide number, the preset diaphragm aperture size is arranged to be smaller.

Figure 12:
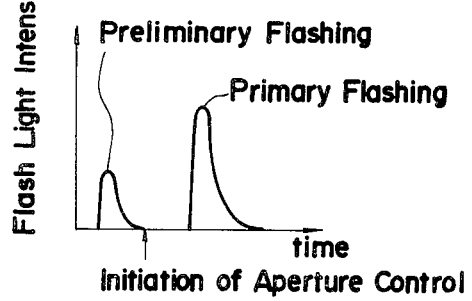
FIG. 12 is another time chart of the flashing relationships of the present invention.

In the embodiment in FIG. 11, the preliminary flashing may not be required to be of a constant intensity for a continued period of time as with the embodiment of FIG. 1, but it may be an instantaneous flash as shown by the flash time schedule in FIG. 12 if the amount of preliminary flash light is identical for every flash. With reference to FIG. 11, a light measuring circuit comprising photodiode P, operational amplifier A11 and logarithmic compression diode D1 generates a voltage proportionate to the logarithm of incident light intensity, and a circuit formed by potentiometer PM1 and constant-voltage regulated power supply E1 adds film sensitivity information to the measured light information to voltage V1. Switch S1 and switch S2 are opened before the diaphragm of the camera objective is stopped-down and after the preliminary flashing has been completed, respectively, in relation to the camera release operation. Serially connected transistor Q11 and capacitor C11 form an integrating circuit responsive to the voltage V0. Switches S3 and S4 are opened immediately upon the camera release operation. With switch S4 opened, preliminary flashing of an electronic flash device is triggered. Voltage V2' charged by capacitor C11 as a result of the preliminary flashing is determined by the following equation.

$$V2' = \alpha \ln Q + \beta$$

Where $\alpha$ is equal to $KT/g$ (K is Boltzmann's constant, T absolute temperature and g the charge of an electron), and Q is the amount of incident light upon photodiode P. Assume that the incident light intensity is I, Q is, $Q = \int L dt$; $\beta$ is a constant dependent upon the characteristics of transistor Q11, film sensitivity information and capacity of capacitor C11 and the like.

$\alpha$ is 26 mV at normal temperature, and therefore, when incident light amount Q is doubled, voltage V2 increases by 18 mV=0.026 ln 2). Voltage V2' at capacitor C11 is applied through buffer amplifier A21 to the plus inputs of operational amplifiers A31 and A41. Along with resistors R, operational amplifiers A31 and A41 form a pair of subtraction circuits, respectively, and when the respective outputs are assumed to be: V5'=V2'−V3' and V6'=V2'−V4', wherein constant voltage V3' corresponds to the most remote distance at which an electronic flash device can provide a correct exposure with a fully open diaphragm aperture of the camera objective, the voltage being supplied by power supply E2. Constant voltage V4' supplied by power supply E3, corresponds to the nearest distance at which the electronic flash device can provide a correct exposure with a fully open diaphragm aperture of the camera objective.

The graph in FIG. 9 indicates the camera-to-object distance along the abscissa with the diaphragm aperture as a parameter and the voltage of capacitor C11 commensurate with the camera-to-object distance along the ordinates. Assume that the maximum and minimum light emission intensities of an electronic pre-emission flash device to be used are Gn=22 and Gn=2.8, respectively when converted to guide numbers, then constant voltage V3' and V4' may correspond to the levels as shown by the ordinate of the graph in FIG. 9. In this case, however, the film sensitivity is ASA 100.

Voltage comparators A51 and A61 generate high level signal "1" when the voltage at their plus terminals is higher than that at their minus terminals, and "0" when the opposite is the case. The plus terminals are connected to the output of operational amplifier A71, which forms a subtracter circuit for conducting the operation of V8'−V9'=V10'. A voltage V10' signal which indicates the difference in the number of steps between the fully open diaphragm aperture and the preset diaphragm aperture value. In more detail, voltage V8' is a signal indicating the fully open diaphragm aperture of the camera objective, the signal being produced from the slider of potentiometer PM3 which is automatically adjusted by the camera objective produced, and voltage V9' is a signal produced from the slider of potentiometer PM2 commensurate with the preset diaphragm aperture of the camera objective. Additionally, potentiometer PM4 generates a voltage signal proportional to the number of steps from the fully open diaphragm aperture to the actually stopped-down diaphragm aperture, and is controlled by a diaphragm drive lever which is moving during diaphragm aperture stopping-down operation. It should be noted that constant-voltage regulated power supply E4 is set so that the levels at the slides of potentiometers PM2, PM3 and PM4 may be varied by a voltage of 18 mV for a one step movement of the sliders of potentiometers PM2, PM3 and PM4, respectively. Signal changeover circuit MP using a multiplexer transmits one of the signals V5′, V6′ and V10′ from terminals J, K and L to terminal O as output V13′ in response to the outputs V11′ and V12′ of voltage comparators A51 and A61. Voltage comparator A81 transmits "1" when signal V7 exceeds output V13′ of multiplexer MP, and energizes electromagnet 9 through AND gate G to restrain the operation of the diaphragm of the camera objective being stopped-down, thereby determining the diaphragm aperture value.

With the above constructed circuit, output V5′−V2′−V3′ of operational amplifier A31 represents the difference in the number of steps between an optimum diaphragm aperture value for the object distance with the maximum light emission and the fully open diaphragm aperture value. Furthermore, output V6′−V2′−V4′ of operational amplifier A41 represents the minimum number of steps by which the diaphragm aperture of the camera objective has to be stopped-down from the fully open diaphragm aperture in order to achieve correct exposure (in case of V6>0). In other words, V6′ is the difference between an optimum diaphragm aperture value for the object distance and the minimum light emission and the fully open diaphragm aperture value. Output V10′ of operational amplifier A71 indicates the number of steps between the fully open aperture value and the present aperture value, as explained earlier.

Therefore, with V10′<V5′ and V10′>V6′, flash photography using a preset diaphragm aperture value is possible. In this case, the outputs of voltage comparators A51 and A61 are:

$$V11′ = \text{"0" and } V12′ = \text{"1"} \qquad (2)$$

With V10′>V5′, i.e., the diaphragm aperture size is preset too small, the diaphragm aperture value has to be changed to a value at which optimum exposure may be obtained under the maximum light emission. In this case, V10′>V6′ is realized. Therefore, outputs V11′ and V12′ are as follows:

$$V11′ = \text{"1" and } V12′ = \text{"1"} \qquad (3)$$

With V10′<V6, i.e., the preset diaphragm aperture value causes overexposure even with the minimum light emission at a distance nearer than 2 m, the diaphragm of a camera objective has to be further stopped-down to an aperture value to produce optimum exposure for the minimum light emission. In this case, V10′<V5′ is realized. Therefore, outputs V11 and V12 are as follows:

$$V11′ = \text{"0" and } V12′ = \text{"0"} \qquad (4)$$

Moreover, when the camera-to-object distance is more than 16 m, outputs V5′ and V6′ of operational amplifiers A51 and A61 are both negative, resulting in the case represented by equation (2). Thus, the above three cases may be realized. Multiplexer MP is arranged to transmit the signal at terminal J to operation amplifier A81 in case of equation (1), the signal at terminal L in case of equation (2) and the signal at terminal K in case of equation (3), respectively. In such a manner, the output V13′ of multiplexer MP is used as a voltage signal indicating the diaphragm aperture value to be set. And signal V13′ is compared with signal V7 to control electromagnet 9.

What is claimed is:

1. Camera system capable of flash photography comprising:
    means for producing a preliminary flash of a relatively long duration at a substantially constant intensity, prior to the production of a primary flash to be used in actual photographing;
    a diaphragm aperture changeable from an initial aperture size during the duration of said preliminary flash light;
    first means for receiving light through said diaphragm aperture during the duration of said preliminary flash to generate a first signal responsive to the intensity of the received light; and
    means for interrupting the change in aperture size of the diaphragm aperture in response to said first signal to determine the aperture size, whereby said primary flash light is produced after the aperture size is determined.

2. Camera system as in claim 1 further comprising second means for receiving light from said primary flash to generate a second signal, and means for controlling the amount of said primary flash in response to said second signal to achieve an optimum exposure commensurate with the determined aperture size.

3. Camera system as in claim 2, wherein said second receiving means is disposed to receive light through the diaphragm aperture with its aperture size determined.

4. Camera system as in claim 1, wherein said interrupting means comprises means for storing said first signal with said diaphragm aperture at its initial aperture size, and means for generating a signal representative of the difference between said stored first signal and said first signal generated during the change in the aperture size.

5. Camera system as in claim 1, wherein said interrupting means comprises means for generating a reference signal and means for comparing said first signal with said reference signal during the change in the aperture size to interrupt the change in the aperture size when a predetermined relationship exists between said reference signal and said first signal.

6. Camera system as claimed in claim 5, wherein said reference signal is equal to the first signal of said receiving means when receiving through said initial aperture size a preliminary flash light reflected from an object of a standard reflectance located at a specific object distance, said specific object distance being such that the product of said object distance and the F-number corresponding to said initial aperture size is equal to a predetermined guide number of said primary flash.

7. Camera system as in claim 5, further comprising means for receiving light from said primary flash to generate a second signal, and means for controlling the amount of said primary flash in response to said second signal to achieve an optimum exposure comensurate with the determined aperture size, and wherein said reference signal generating means comprises means for changing said reference signal in accordance with said first signal with said diaphragm aperture at its initial aperture size.

8. Camera system as in claim 7, wherein said changing means comprises means responsive to said initial aperture size for converting said first signal into a signal corresponding to a standardized imaginary initial aperture size and changing said reference signal in accordance with said converted signal.

9. Camera system as in claim 5, wherein said reference signal is a predetermined constant value.

10. Camera system as in claim 9 further comprising means for detecting the influence of the ambient light on the first signal, and means for modifying said first signal with said detected influence of the ambient light taken into consideration.

11. Camera system as in claim 9 further comprising means for presetting a position at which said change in aperture size of said diaphragm aperture is interrupted, whereby the change in aperture size of said diaphragm aperture is interrupted at said preset position if said predetermined relationship between said reference signal and said first signal does not exist during the change in aperture size from said initial aperture size to and aperture size corresponding to said preset position.

12. Camera system as claimed in claim 5, wherein said generating means includes means responsive to said receiving means for accommodating said reference signal at a level between a predetermined level and a level of the first signal of said receiving means when receiving through said initial aperture size a preliminary flash light reflected from an object to be photographed.

13. Camera system as claimed in claim 12, wherein said predetermined level is equal to that of the first signal of said receiving means when receiving through said initial aperture size a preliminary flash light reflected from an object of a standard reflectance located at a specific object distance, said specific object distance being such that the product of said object distance and the F-number corresponding to said initial aperture size is equal to a maximum guide number of said primary flash.

14. Camera system as claimed in claim 12 further comprising means for self-controlling the guide number of said primary flash by measuring the primary flash light reflected from an object to be photographed, for achieving an optimum exposure commensurate with the determined aperture size.

15. Camera system capable of flash photography comprising:
    means for producing a preliminary flash prior to the production of a primary flash to be used in actual photographing;
    a diaphragm aperture changeable from an initial aperture size;
    means for receiving light from said preliminary flash to generate a first signal;
    means for presetting an aperture value; and
    means, responsive to said first signal from said light receiving means and to said aperture value of said presetting means, for interrupting the change in aperture size of said diaphragm aperture, in accordance with said preset aperture value if a first relationship exists between said preset aperture value and said first signal, and in accordance with said first signal if a second relationship exists between said preset aperture value and said first signal, whereby said primary flash light is produced after the change in aperture size is interrupted.

16. Camera system as in claim 11 further comprising means for receiving light from said primary flashing to generate a second signal, and means for controlling the amount of said primary flash in response to said second signal to achieve an optimum exposure commensurate with the determined aperture size.

17. Camera system as in claim 11, wherein said preliminary flash producing means comprises means for making the intensity of said preliminary flash substantially constant during the duration thereof.

18. Camera system as in claim 13, further comprising means for generating a predetermined constant reference signal, and wherein said light receiving means receives light through said diaphragm aperture during the change in aperture size thereof to generate said first signal as information indicative of the intensity of the received light, and said interrupting means is adapted to interrupt said change in aperture size in accordance with said preset aperture value if a predetermined relationship between said reference signal and said first signal does not exist during the change in aperture size from said initial aperture size to a size corresponding to said preset aperture value, and to interrupt said change in aperture size when said predetermined relationship between said reference signal and said first signal exists in the course of said change in aperture size from said initial aperture size toward said size corresponding to said preset aperture value.

19. Camera system capable of flash photography comprising:
    means for producing a preliminary flash prior to the production of a primary flash to be used in actual photographing;
    a diaphragm aperture changeable from an initial aperture size;
    means for receiving light from said preliminary flash to generate a first signal;
    means for presetting an aperture value;
    means, responsive to said first signal from said light receiving means and to said aperture value of said presetting means, for interrupting the change in aperture size of said diaphragm aperture, in accordance with said preset aperture value if a first relationship exists between said preset aperture value and said first signal, and in accordance with said first signal if a second relationship exists between said preset aperture value and said first signal, whereby said primary flash light is produced after the change in aperture size is interrupted;
    first means responsive to said preset aperture value for providing a first information indicative of a difference between the initial aperture size and an aperture size corresponding to said preset aperture value;
    second means responsive to said first signal for providing a second information indicative of a difference between the initial aperture size and an aperture size suitable for achieving an optimum exposure under a predetermined amount of said primary flash;
    and third means responsive to the change in the aperture size for providing a third information indicative of a difference between the initial aperture size and an actual aperture size realized by the change in aperture size;
    and wherein said interrupting means interrupts said change in aperture size when said third information coincides with said first and second information, and interrupts said change in aperture size when said third information coincides with said second information if a second relationship exists between said first and second information.

20. Camera system as in claim 19, wherein said predetermined amount of the primary flash light relating to said second information is the minimum amount capable of being produced.

21. Camera system as in claim 19, wherein said predetermined amount of the primary flash light relating to said second information is the maximum amount capable of being produced.

22. Camera system as in claim 21 further comprising fourth means responsive to said first signal for providing a fourth information indicative of a difference between the initial aperture size and aperture size suitable for achieving an optimum exposure under a minimum amount of said primary flash capable of being produced, and wherein said interrupting means is for interrupting said change in aperture size when said third information coincides with said first information if a first relationship exists between said first and fourth information, and for interrupting said change in aperture when said third information coincides with said fourth information if a second relationship exists between said first and fourth information.

23. In a camera system capable of ordinary photography with the ambient light in a first mode and flash photography in a second mode in which a preliminary flash of a relatively long duration at a substantially constant intensity is produced prior to the production of a primary flash to be used in actual photographing, a camera in said camera system comprising:
   means for changing between said first and second modes;
   a diaphragm aperture having a changeable aperture size from an initial aperture size;
   means for receiving light through said diaphragm aperture during the change in aperture size from said initial aperture size, said receiving means generating a signal responsive to the intensity of the received light;
   means for generating a reference signal;
   means for comparing the signal of said receiving means and said reference signal during the change in said aperture size;
   means responsive to said comparing means for interrupting the change in said aperture size when a predetermined relation exists between the signal of said receiving means and said reference signal to determine the aperture size;
   means for causing said preliminary flash in synchronization with said change in the aperture size from said initial aperture size in said second mode; and
   means for shifting said reference signal in response to said changing means to accommodate said reference signal for the comparisons with the ambient light in said first mode and with the preliminary flash in said second mode.

24. Camera system as claimed in claim 23, wherein said shifting means includes means for accommodating said reference signal in said second mode at a level equal to that of the signal of said receiving means when receiving through said initial aperture size a preliminary flash light reflected from an object of a standard reflectance located at a specific object distance, said specific object distance being such that the product of said object distance and the F-number corresponding to said initial aperture size is equal to a predetermined guide number of said primary flash.

25. Camera system as claimed in claim 23, wherein said shifting means includes means responsive to said receiving means for accommodating said reference signal in said second mode at a level between a predetermined level and a level of the signal of said receiving means when receiving through said initial aperture size a preliminary flash light reflected from an object to be photographed.

26. Camera system as claimed in claim 25, wherein said predetermined level is equal to that of the signal of said receiving means when receiving through said initial aperture size a preliminary flash light reflected from an object of a standard reflectance located at a specific object distance, said specific object distance being such that the product of said object distance and the F-number corresponding to said initial aperture size is equal to a maximum guide number of said primary flash.

27. Camera system as claimed in claim 25, wherein said accommodating means includes means for dividing with a predetermined ratio a difference between said predetermined level and said level of the signal of said receiving means when receiving through said initial aperture size a preliminary flash light reflected from an object to be photographed, for determining said reference signal.

28. Camera system capable of flash photography comprising:
   means for producing a preliminary flash prior to the production of a primary flash to be used in actual photographing;
   a diaphragm aperture changeable from an initial aperture size;
   means for receiving light from said preliminary flash to generate a first signal;
   means for presetting an aperture value; and
   means responsive to said first signal from said light receiving means and to said aperture value of said presetting means for determining the aperture size of said diaphragm aperture in accordance with a greater one of a pair of aperture sizes corresponding to said preset aperture value and to said first signal, respectively,
   whereby said primary flash light is produced after the aperture size is determined.

* * * * *